(12) United States Patent
Inoue

(10) Patent No.: US 8,888,081 B2
(45) Date of Patent: Nov. 18, 2014

(54) STRUT MOUNT

(75) Inventor: Tsuyoshi Inoue, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 84 days.

(21) Appl. No.: 13/516,632

(22) PCT Filed: Dec. 15, 2010

(86) PCT No.: PCT/JP2010/007288
§ 371 (c)(1),
(2), (4) Date: Jul. 16, 2012

(87) PCT Pub. No.: WO2011/074259
PCT Pub. Date: Jun. 23, 2011

(65) Prior Publication Data
US 2012/0280441 A1 Nov. 8, 2012

(30) Foreign Application Priority Data

Dec. 16, 2009 (JP) ................................. 2009-285368

(51) Int. Cl.
  *B60G 15/06* (2006.01)
  *F16F 9/54* (2006.01)
  *F16F 1/38* (2006.01)
  *B60G 13/00* (2006.01)

(52) U.S. Cl.
  CPC ... *F16F 9/54* (2013.01); *F16F 1/38* (2013.01); *B60G 2206/82* (2013.01); *B60G 13/003* (2013.01); *B60G 2206/013* (2013.01); *B60G 2206/41* (2013.01); *B60G 2204/128* (2013.01); *B60G 2206/91* (2013.01); *B60G 2204/418* (2013.01)
  USPC ................ 267/220; 188/321.11; 280/124.155

(58) Field of Classification Search
  USPC ............................. 267/219, 220; 188/321.11; 280/124.121, 124.123, 124.155, 280/124.177
  See application file for complete search history.

(56) References Cited

U.S. PATENT DOCUMENTS 4,971,296 A * 11/1990 Kondo ........................... 267/220
  2007/0144850 A1 * 6/2007 Hattori .................... 280/124.155

FOREIGN PATENT DOCUMENTS

| GB | 2217663 A | * 11/1989 |
| GB | 2266941 A | * 11/1993 |
| JP | 56-63143 A | 5/1981 |
| JP | 2004-232824 A | 8/2004 |
| JP | 2007-107714 A | 4/2007 |

OTHER PUBLICATIONS

International Search Report, PCT/JP2010/007288, Mar. 8, 2011.
Office Action issued by the Chinese Patent and Trademark Office in Chinese Patent Application No. 201080062192.9 dated Feb. 7, 2014.
Japanese Office Action dated Jul. 29, 2014 issued in corresponding JP Application No. 2011-545984.
Chinese Office Action dated Sep. 22, 2014 issued in corresponding CN application No. 201080062192.9.

* cited by examiner

*Primary Examiner* — Thomas J Williams
(74) *Attorney, Agent, or Firm* — Sughrue Mion, PLLC

(57) ABSTRACT

Disclosed is a strut mount wherein an inclination of an outer circumferential surface of an outer cylinder (2) with respect to the central axis of the outer cylinder (2) is greater than that of an inner circumferential surface of a tapered sidewall (12) of a vehicle body panel (10) which is shaped like an inverted dish. When the strut mount is positioned to be fitted to the vehicle body panel (10), the elastic member (4) is brought into contact with the inner surface of the vehicle body panel (10) only at a portion (4a) of the elastic member (4) that covers the outer circumferential surface of the outer cylinder (2).

5 Claims, 5 Drawing Sheets ns to a strut mount comprising:

STRUT MOUNT

CROSS REFERENCE TO RELATED APPLICATIONS

This application is a National Stage of International Application No. PCT/JP2010/007288 filed Dec. 15, 2010, claiming priority based on Japanese Patent Application No. 2009-285368 filed Dec. 16, 2009, the contents of all of which are incorporated herein by reference in their entirety.

TECHNICAL FIELD

The present invention relates to a strut mount comprising: an outer cylinder formed in a tapered shape having a diameter increasing downward along its central axis; an inner cylinder arranged on the inner circumference side of the outer cylinder; and an elastic member connecting the outer cylinder and the inner cylinder and covering an outer circumferential surface and ends of the outer cylinder, the strut mount being subjected to use with a strut rod extending from wheel and a vehicle body panel shaped like an inverted dish and provided with a through-hole in its bottom surface by positioning the strut mount so that an upper end of the strut rod penetrates through the inside of the inner cylinder and the outer cylinder is fitted to the inner surface of the vehicle body panel. The present invention proposes a technique that improves stability and ride quality of a vehicle during driving, by positioning the strut mount to be fitted to the inner surface of the vehicle body panel in an appropriate and secure manner.

BACKGROUND ART

An example of this type of strut mount is disclosed in Patent Document 1. A strut mount 51, which is shown in the longitudinal sectional view of FIG. 8, comprises: an outer cylinder 52 formed in a tapered shape having a diameter increasing downward along its central axis; an inner cylinder 53 arranged on the inner circumference side of the outer cylinder 52; and an elastic member 54 connecting the outer cylinder 52 and the inner cylinder 53 and covering an outer circumferential surface and ends of the outer cylinder 52.

This strut mount 51 is used with a strut rod 55 which forms a part of a not-illustrated shock absorber on a wheel and a vehicle body panel 56 which is shaped like an inverted dish and provided with a through-hole 56a in its bottom surface. Here, an upper end 55a of a strut rod 55 is arranged to penetrate through the inside of the inner cylinder 53 and the outer cylinder 52 of the strut mount 51 is fitted to the inner surface of a vehicle body panel 56. The strut mount 51 is, at the same time, fastened and secured to a stopper fitting 57 having larger outer contour dimensions than the through-hole 56a. In this way, the strut mount 51 functions as a suspension device for reducing transmission of vibration between the vehicle body and the wheel.

That is, according to such a suspension device, most of an input force from the wheel to the body received from the road surface when the vehicle travels is absorbed by a coil spring 58 and the shock absorber, a part of the input force that could not be absorbed by the coil spring 58 and the shock absorber is absorbed by the strut mount 51, and an input force from the body to the wheel is absorbed mainly by means of shearing deformation of the elastic member 54 of the strut mount 51. As a result, the suspension device can reduce transmission of vibration from the road surface to the body sufficiently and thereby can improve ride quality of the vehicle.

PRIOR ART DOCUMENT

Patent Document

Patent Document 1: Japanese Patent Laid-Open No. 2004-232824

SUMMARY OF THE INVENTION

Problem to be Solved by the Invention

Meanwhile, with this conventional strut mount 51 that has the tapered outer cylinder 52 to be fitted to the inside of the vehicle body panel 56 shaped like an inverted dish, the following situation can occur when the strut mount 51 is disposed between the vehicle body panel 56 and the strut rod 55: the elastic member 54 of the strut mount 51 will come in contact with the inner surface of the vehicle body panel 56 only at a portion 54a thereof that covers the upper end of the outer cylinder 53, as exaggerated in the enlarged sectional view of FIG. 9 which shows a part where the strut mount 51 is fitted to the vehicle body panel 56. This situation is caused by some processing errors of the vehicle body panel 56, i.e., processing errors in, e.g., angle of inclination of a tapered sidewall 56b, which may necessarily occur at the time of processing and forming the vehicle body panel 56. As a result, there can be a gap 57 between the inner circumferential surface of the tapered sidewall 56b of the vehicle body panel 56 and the elastic member 54 on the lower side of a portion 54b covering the outer circumferential surface of the outer cylinder 53 of the elastic member 54.

If such a gap 57 is formed between the strut mount 51 and the inner surface of the vehicle body panel 56, the strut mount 51 is fitted to the inside of the vehicle body panel 56 with the central axis of the strut mount 51 being displaced in a direction inclined with respect to the central axis of the through-hole 56a of the vehicle body panel 56. Further, when the strut mount 51 is affected by a force in such a direction as to make the central axis of the strut mount 51 inclined with respect to the central axis of the vehicle body panel 56, force in a direction orthogonal to the central axis of the strut mount 51, force in such a direction as to rotate the strut mount 51 about its central axis or the like while the vehicle is being driven, the strut mount 51 connected to the strut rod 55 on the wheel undergoes relative displacements inside the vehicle body panel 56 with respect to the vehicle body panel 56 in the respective directions of force mentioned above. These could affect stability and ride quality of the vehicle during driving.

The present invention aims at solving these problems of the prior art. An abject of the present invention is to provide a strut mount that achieves improved driving stability and ride quality of a vehicle by preventing the occurrence of a displacement of the fitting position of the strut mount when fitted to the vehicle body panel, or a relative displacement of the strut mount with respect to the vehicle body panel while the vehicle is being driven, regardless of processing accuracy of the vehicle body panel.

Means for Solving the Problem

The present invention provides a strut mount that comprises: an outer cylinder formed in a tapered shape having a diameter increasing downward along its central axis; an inner cylinder arranged on the inner circumference side of the outer cylinder; and an elastic member connecting the outer cylinder and the inner cylinder and covering an outer circumferential surface and ends of the outer cylinder, the strut mount being subjected to use with a strut rod extending from a wheel and a vehicle body panel shaped like an inverted dish and provided with a through-hole in its bottom surface by positioning the strut mount so that an upper end of a strut rod penetrates through the inside of the inner cylinder and the outer cylinder is fitted to the inner surface of a vehicle body panel, wherein an inclination of the outer circumferential surface of the outer cylinder with respect to the central axis of the outer cylinder is greater than that of an inner circumferential surface of a tapered sidewall of the vehicle body panel shaped like an inverted dish, and when the strut mount is positioned to be fitted to the vehicle body panel, the elastic member is brought into contact with the inner surface of the vehicle body panel only at a portion of the elastic member, that covers the outer circumferential surface of the outer cylinder.

As used herein, the expression of "an inclination of the outer circumferential surface of the outer cylinder with respect to the central axis of the outer cylinder is greater than that of an inner circumferential surface of a tapered sidewall of the vehicle body panel shaped like an inverted dish" means that the outer circumferential surface of the outer cylinder has an angle of inclination with respect to its central axis that is larger than a design value of an angle of inclination for the tapered sidewall of the vehicle body panel with respect to the central axis of the outer cylinder.

Preferably, the portion of the elastic member that covers the outer circumferential surface of the outer cylinder has a larger thickness in an upper part than in a lower part of the central axis of the outer cylinder.

Further, the inner circumferential surface of a lower end of the outer cylinder is preferably provided with a curved surface facing radially inwardly over the entire circumference of the inner circumferential and more preferably, the lower end of the outer cylinder is curved radially outwardly over the entire circumference of the lower end.

A bulging portion bulging radially outwardly is preferably formed in the outer circumferential surface of the upper end of the outer cylinder over the entire circumference.

Effect of the Invention

According to the strut mount of the present invention, the inclination of the outer circumferential surface of the outer cylinder with respect to the central axis of the outer cylinder is greater than that of the inner circumferential surface of the tapered sidewall of the vehicle body panel shaped like an inverted dish, and when the strut mount is positioned to be fitted to the vehicle body panel, the elastic member is brought into contact with the inner surface of the vehicle body panel only at a portion of the elastic member, that covers the outer circumferential surface of the outer cylinder. This brings the strut mount into large contact with the inner surface of the vehicle body panel, mainly at a portion of the elastic member that covers a lower end part of the outer circumferential surface of the outer cylinder thereof, while providing a larger contact area between the tapered side surface of the elastic member and the inner circumferential surface of the tapered sidewall of the vehicle body panel based on escaping deformations of a portion of the elastic member that is sandwiched between the outer cylinder and the vehicle body panel caused by the weight of the vehicle body acting on the strut mount.

As a result, regardless of processing errors of the vehicle body panel, the strut mount may always be fitted to the inner surface of the vehicle body panel in an appropriate manner without any displacements. Additionally, by virtue of an increased level of close contact between the strut mount and the inner circumferential surface of the vehicle body panel, the strut mount may be less prone to relative displacements with respect to the vehicle body panel while the vehicle is being driven, thereby improving stability and ride quality of the vehicle during driving.

Moreover, in the strut mount of the present invention, the inclination of the outer circumferential surface of the outer cylinder with respect to the central axis of the outer cylinder is greater than that of the inner circumferential surface of the tapered sidewall of the vehicle body panel shaped like an inverted dish, which results in the outer circumferential surface on the lower end side of the outer cylinder closer to the inner surface of the vehicle body panel than the outer circumferential surface on the upper end side thereof. As such, even if any force acts on the strut mount in such a direction as to cause the strut mount to be pushed into the vehicle body panel, a portion on the lower end side of the outer cylinder made of rigid material will resist such a pushing force via a portion of the elastic member covering the outer circumferential surface of that portion on the lower end side. Accordingly, even if the elastic member of the strut mount is deformed by different forces acting on the strut mount while the vehicle is being driven, the strut mount may still be kept in contact with the inner surface of the vehicle body panel only at a portion of the elastic member, that covers the outer circumferential surface of the outer cylinder.

Here, in a case where the thickness of the portion of the elastic member covering the outer circumferential surface of the outer cylinder is increased in an upper part than in a lower part of the central axis of the outer cylinder, not only a portion of the elastic member on the lower end side, but also a portion of the elastic member on the upper end side of the outer cylinder with the increased thickness will be brought into contact with the inner circumferential surface of the vehicle body panel. This provides a larger contact area between the elastic member and the inner circumferential surface of the tapered sidewall of the vehicle body panel. Consequently, the strut mount is positioned to be fitted to the vehicle body panel in an even more secure manner.

Additionally, in a case where the outer circumferential surface of the lower end of the outer cylinder is dimpled radially inwardly over the entire circumference, and in particular, where the lower end of the outer cylinder is curved radially outwardly over the entire circumference, it becomes possible to effectively prevent generation of cracks in the elastic member at the lower end of the outer cylinder, which would be caused by contact between the lower end of the outer cylinder and the elastic member which undergoes escaping deformation, by which it is forced to move around from the lower end to the outer circumferential surface of the outer cylinder as various inputs act on the strut mount. This may improve durability performance of the strut mount.

In a case where a bulging portion bulging radially outwardly is formed in the outer circumferential surface of the upper end of the outer cylinder over the entire circumference, a larger surface pressure, i.e., a frictional force is generated between the inner circumferential surface of the tapered sidewall of the vehicle body panel and a portion of the elastic member that covers this bulging portion when the strut mount is positioned to be fitted to the vehicle body panel, as compared with those generated between the inner circumferential surface and the other portions covering the outer cylinder. Therefore, relative displacements of the strut mount with respect to the vehicle body panel that would otherwise be encountered while the vehicle is being driven may be still further reduced, thereby further improving driving stability and ride quality of the vehicle.

In addition, by means of this bulging portion formed in the outer circumferential surface on the upper end side of the outer cylinder, if any force acts on the strut mount in such a direction as to cause the strut mount to be pushed into the vehicle body panel, the bulging portion should resist such a force with an adequate reaction force against the vehicle body panel. Thus, the strut mount may be kept in contact with the inside of the vehicle body panel only at the portion of the elastic member that covers the outer circumferential surface of the outer cylinder. This contributes to further increase the above-described effect of improving stability and ride quality of the vehicle during driving.

BEST MODE FOR CARRYING OUT THE INVENTION

Figure 1:
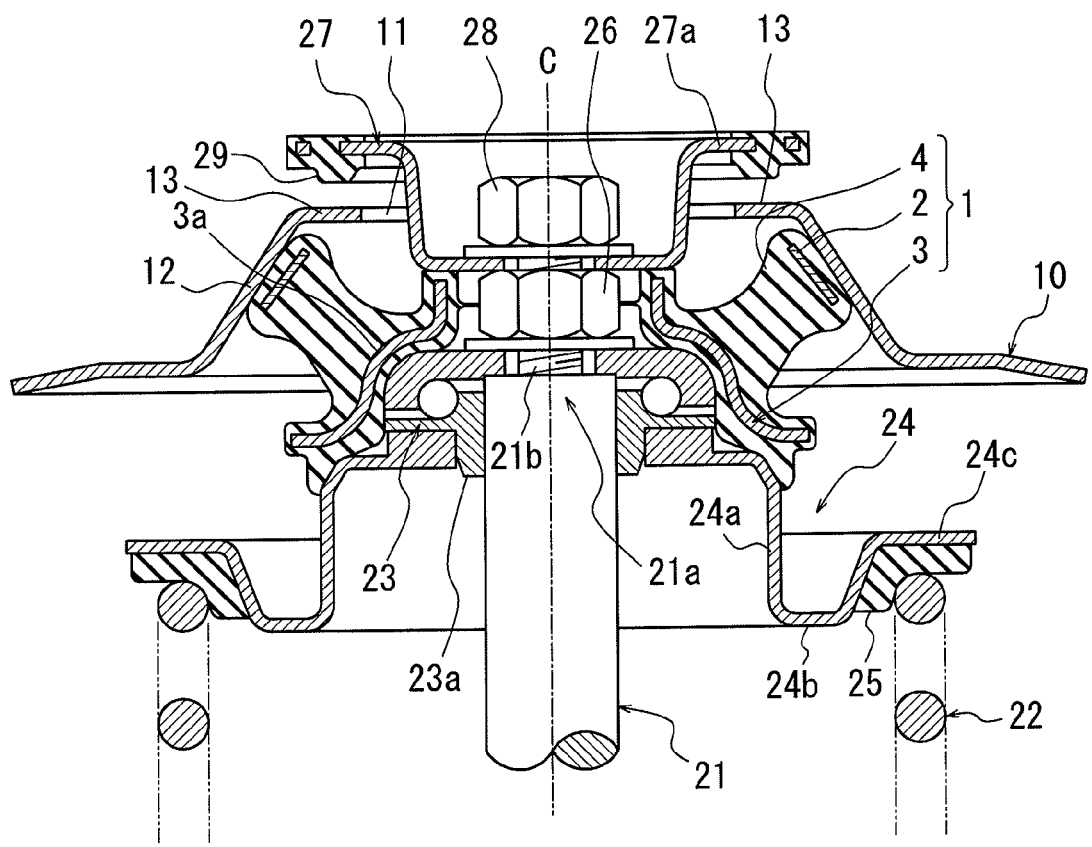
FIG. 1 is a vertical sectional view including a central axis, illustrating a suspension device with a strut mount of the present invention attached thereto.

Embodiments of a strut mount of the present invention will be described below with reference to the accompanying drawings. In the drawings, the reference numeral 1 indicates a strut mount which is disposed between body-side and wheel-side members.

This strut mount 1 comprises: an outer cylinder 2 formed in a tapered shape having a diameter increasing downward along its central axis C; an inner cylinder 3 arranged on the inner circumference side of the outer cylinder 2; and an elastic member 4 connecting an inner circumferential surface of the outer cylinder 2 and an outer circumferential surface of the inner cylinder 3 and covering an outer circumferential surface and ends of the outer cylinder 2. In using such a strut mount 1, the strut mount 1 is disposed between the vehicle body panel 10 and a not-illustrated shock absorber surrounded by a coil spring 22 while the outer cylinder 2 is fitted to the inside of a vehicle body panel 10 which is shaped like an inverted dish and provided with a through-hole 11 in its bottom surface and an upper end 21a of a strut rod 21 which forms part of the shock absorber on the wheel side is positioned to penetrate through the inner cylinder 3.

In this way, in the strut mount 1 that is disposed around the upper end 21a of the strut rod 21 on the wheel side, the elastic member 4 comes in contact with the inner circumferential surface of the vehicle body panel 10 via the outer cylinder 2 to elastically support the weight of the vehicle body from the vehicle body panel 10 so that the strut mount 1 serves for absorbing a part of an input force received by a wheel from the road surface, that could not be absorbed by the shock absorber and the coil spring 22.

In this case, both the outer cylinder 2 and the inner cylinder 3 are formed by rigid material such as metal material, and as shown in the figures, each of the outer cylinder 2 and the inner cylinder 3 forms a circular cylindrical shape having a diameter increasing from top to bottom along the common central axis C of both cylinders 2 and 3. It is noted that, in this embodiment shown, the outer cylinder 2 is a tapered circular cylinder that has a diameter increasing linearly from top to bottom along the central axis C, whereas the inner cylinder 3 having a larger thickness than the outer cylinder 2 is a circular cylinder of deformed shape that has a shoulder portion 3a, which bulges toward the outer circumference side over the entire circumference thereof, formed in a substantially central region in the direction of the central axis C.

Additionally, in this case, the elastic member 4, which connects the inner circumferential surface of the outer cylinder 2 and the outer circumferential surface of the inner cylinder 3, covers the outer circumferential surface and both ends of the outer cylinder 2, as described above, and brings the strut mount 1 into contact with the inner circumference of the vehicle body panel 10 at this portion of the elastic member 4 covering the outer cylinder. In addition, in the strut mount 1 shown in the drawings, the inner circumferential surface and both ends of the inner cylinder 3 are also covered with the elastic member 4 so that the strut mount 1 is brought into contact with a thrust bearing 23 and a bracket 24 arranged within the shoulder portion 3a of the inner cylinder 3, as described below, at this portion of the elastic member 4 covering the inner cylinder.

The cylinders 2, 3 are preferably formed so that an inner diameter of the upper end of the outer cylinder 2 is smaller than an outer diameter of the lower end of the inner cylinder 3. This configuration may prevent vehicle breakdowns, which would otherwise occur when the inner cylinder 3 breaches above the outer cylinder 2 along with the strut rod 21 of the shock absorber on the wheel side, even if the elastic member 4 of the strut mount 1 supporting the vehicle body panel 10 is ruptured while the vehicle is being driven.

Figure 2:
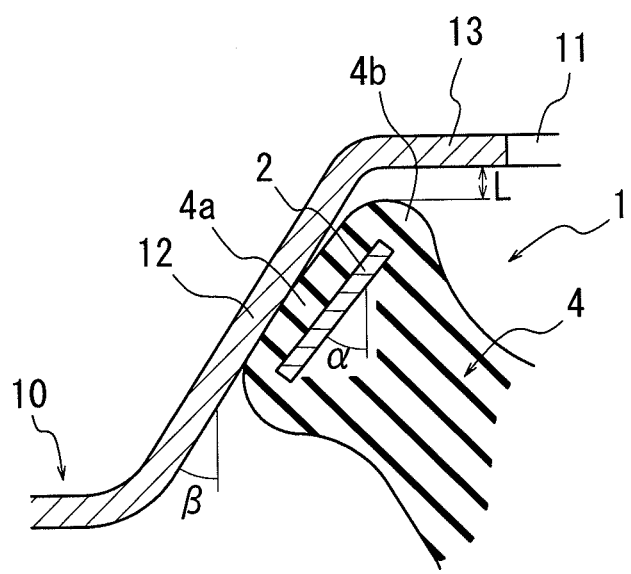
FIG. 2 is an enlarged vertical sectional view of essential parts, illustrating a part where the strut mount shown in FIG. 1 is fitted to a vehicle body panel.

In the strut mount 1 of the present invention, as shown in the enlarged view of FIG. 2 illustrating a part where the strut mount 1 comes in contact with the vehicle body panel 10, an inclination of the outer circumferential surface of the outer cylinder 2 with respect to the central axis C of the outer cylinder 2 is greater than that of the inner circumferential surface of the tapered sidewall 12 of the vehicle body panel 10. That is, the outer cylinder 2 has an angle of inclination $\alpha$ from the vertical direction of the figure that is larger than a design value $\beta$ of an angle of inclination for the tapered sidewall 12 of the vehicle body panel 10, preferably by about 1-5 degrees. Further, according to the present invention, when the strut mount is positioned to be fitted to the vehicle body panel 10, the elastic member 4 is brought into contact with the inner surface of the vehicle body panel 10 only at a portion 4a thereof that covers the outer circumferential surface of the outer cylinder 2.

With the strut mount 1 thus configured, when the strut mount 1 is fitted to the vehicle body panel 10, the portion 4a of the elastic member that is readily deformable to the lower and upper sides of the outer cylinder 2 comes in contact with the inner circumferential surface of the tapered sidewall 12 of the vehicle body panel 10, whereas the portion 4b of the elastic member covering the upper end of the outer cylinder 2 does not come in contact with the inner surface of a flat annular portion 13 that forms the rim of the through-hole 11 of the vehicle body panel 10. As such, the weight of the vehicle body is supported only by this portion 4a of the elastic member. Then, by the action of the weight of the vehicle body, the portion 4a of the elastic member that is sandwiched between the outer cylinder 2 and the vehicle body panel 10 undergoes escaping deformations to the lower and upper sides of the outer cylinder 2. This provides the portion 4a of the elastic member with a larger contact area on the lower end side of the outer cylinder 2. Consequently, the strut mount 1 may always be positioned to be fitted to the vehicle body panel 10 in an appropriate and secure manner.

In addition, since the outer cylinder 2 has an angle of inclination α that is larger than a design value β of an angle of inclination for the tapered sidewall 12 of the vehicle body panel 10, the outer cylinder 2, which is made of rigid material, resists at its lower end any force acting in such a direction as to cause the strut mount 1 to be pushed into the vehicle body panel 10 when the weight of the vehicle body acts on the strut mount 1. As a result, the portion 4b of the elastic member covering the upper end of the outer cylinder 2 is kept from contact with the inner surface of the flat annular portion 13 of the vehicle body panel 10.

It is preferred that a distance L between the portion 4b of the elastic member covering the upper end of the outer cylinder 2 and the inner surface of the flat annular portion 13 of the vehicle body panel 10 is preferably 0.5 mm or more when the strut mount is positioned to be fitted to the vehicle body panel. The presence of a gap of 0.5 mm or more between these members allows only the portion 4a of the elastic member that covers the outer circumferential surface of the outer cylinder 2 to be brought into contact with the inner circumferential surface of the vehicle body panel 10, without contact of the portion 4b of the elastic member that covers the upper end of the outer cylinder 2 with the inner surface of the flat annular portion 13 of the vehicle body panel 10, even if the elastic member 4 is deformed by various forces acting on the strut mount 1 while the vehicle is being driven.

In this case, the angle of inclination α of the outer cylinder 2 is compared with the design value β of an angle of inclination for the tapered sidewall 12 of the vehicle body panel 10. This is because the strut mount 1 of the present invention is intended to prevent, for example, the occurrence of a displacement of the fitting position of the strut mount 1 when fitted to the vehicle body panel 10, which would otherwise be caused by any processing errors of the vehicle body panel 10.

Figure 3:
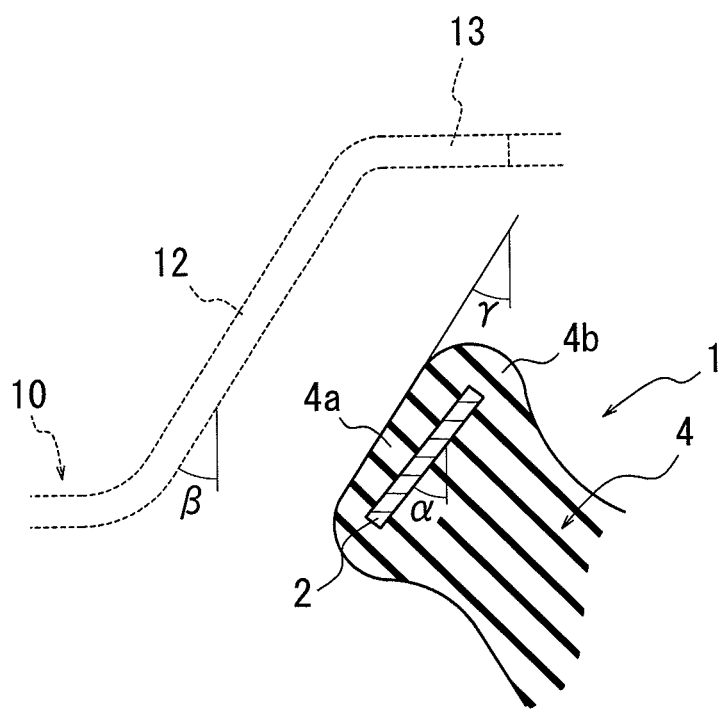
FIG. 3 is an enlarged sectional view of essential parts, illustrating an angle of inclination of the outer surface of a portion of an elastic member that covers the outer circumferential surface of an outer cylinder before fitted to the vehicle body panel.

Meanwhile, where the strut mount 1 is not yet fitted to the vehicle body panel 10 as shown in FIG. 3, it is preferred that an area of the outer surface of the portion 4a of the elastic member covering the outer circumferential surface of the outer cylinder 2 that comes in contact with at least the vehicle body panel 10 has an angle of inclination γ from the central axis of the outer cylinder 2 that is substantially equal to the design value β of a similar angle of inclination for the tapered sidewall 12 of the vehicle body panel 10, as shown by broken line on the upper side of the figure. This is for the purpose of preventing degradation in durability performance of this strut mount 1, in which the portion 4b of the elastic member covering the upper end of the outer cylinder 2 is contactlessly positioned relative to the inner surface of the flat annular portion 13 of the vehicle body panel 10 when the strut mount is positioned to be fitted to the vehicle body panel 10.

That is, if the outer surface of the elastic member 4 has an angle of inclination γ that is smaller than the design value β of an angle of inclination of the inner circumferential surface of the vehicle body panel 10, the portion 4a of the elastic member covering the outer circumferential surface of the outer cylinder 2, on which portion most of the weight of the vehicle body acts, should undergo a significant deformation in a diagonally downward direction along the outer circumferential surface of the tapered outer cylinder 2 in the strut mount 1 which is positioned without contact the portion 4b of the elastic member with the flat annular portion 13 when that strut mount 1 is fitted to the vehicle body panel 10 for use. Consequently, the portion 4b of the elastic member around the upper end of the outer cylinder, that is dragged by the above-described deformation of the portion 4a of the elastic member, should undergo a deformation, by which it is forced to move around from the inner circumference side to the outer circumference side of the upper end of the outer cylinder 2, in combination with escaping deformations of a portion of the elastic member on the inner circumference side of the outer cylinder 2 under the action of compressive force. This may result in exfoliation of the portion 4b of the elastic member from the upper end of the outer cylinder 2. Alternatively, if the outer surface of elastic member 4 has an angle of inclination γ that is larger than the design value β of an angle of inclination for the inner circumferential surface of the vehicle body panel 10, the large weight of the vehicle body acts on a part on the lower side of the portion 4a of the elastic member covering the outer circumferential surface of the outer cylinder 2 when the strut mount 1 is positioned to be fitted to the vehicle body panel 10. This may deteriorate durability of the portion of the elastic member around the lower end of the outer cylinder. In addition to this, there is a concern that a decrease in contact area between the tapered outer surface of the elastic member 4 and the inner circumferential surface of the tapered sidewall of the vehicle body panel 10 may interfere with full use of the effect of the present invention of improving the stability and ride quality of the vehicle during driving.

Figure 4:
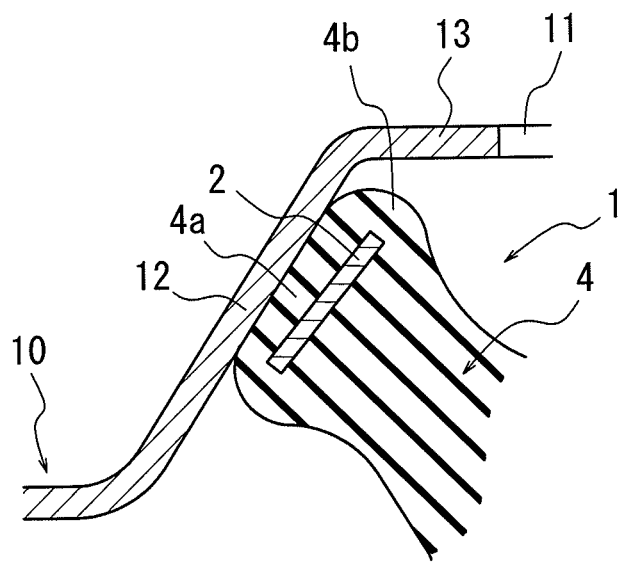
FIG. 4 is an enlarged vertical sectional view of essential parts, illustrating a part where a strut mount of another embodiment is fitted to the vehicle body panel.

Besides, as shown in FIGS. 1 and 2, the portion 4a of the elastic member 4 covering the outer cylinder has a constant thickness from the upper side to the lower side of the central axis C of the outer cylinder 2. However, from the viewpoint of achieving even higher levels of close contact between the portion 4a of the elastic member and the inner surface of the vehicle body panel 10, it is preferred that the portion 4a has a larger thickness in an upper part than in a lower part of the central axis of the outer cylinder, as shown in FIGS. 3 and 4. In addition, this portion 4a of the elastic member 4 covering the outer cylinder preferably has a thickness of 0.5 mm or more even at the thinnest part. This is for the purpose of achieving an appropriate fitting position of the strut mount 1 to the vehicle body panel 10, by means of deformations of the portion 4a of the elastic member 4 covering the outer cylinder, irrespective of the absence or presence of errors in processing accuracy of the vehicle body panel 10.

Figure 5:
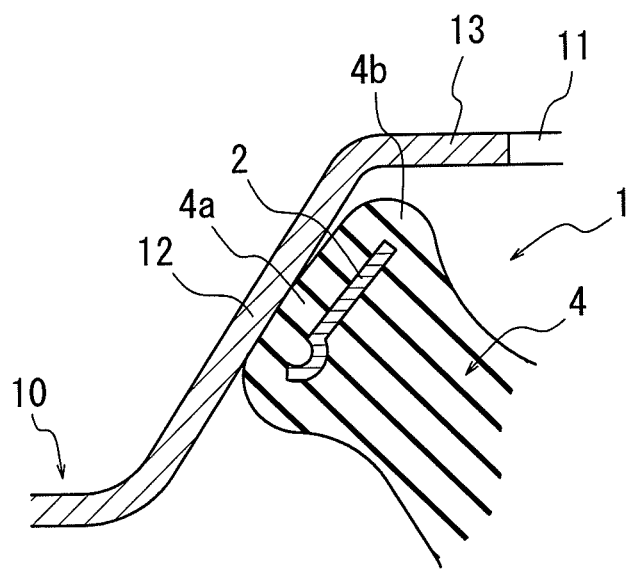
FIG. 5 is an enlarged vertical sectional view of essential parts, illustrating a part where a strut mount of another embodiment is fitted to the vehicle body panel.
Figure 6:
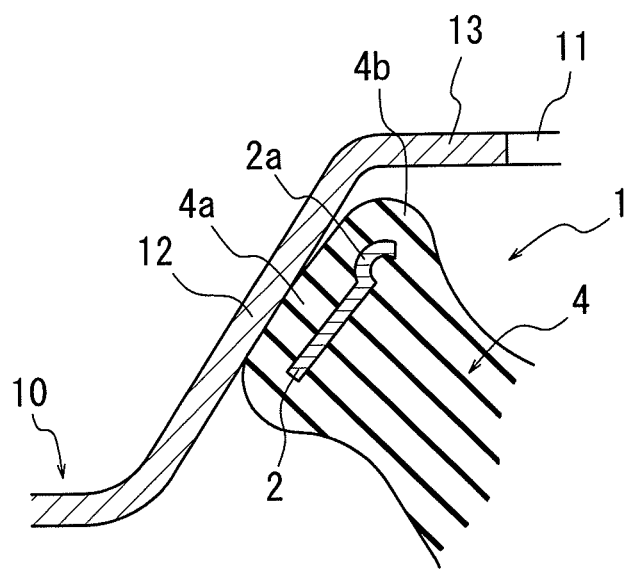
FIG. 6 is an enlarged vertical sectional view of essential parts, illustrating a part where a strut mount of another embodiment is fitted to the vehicle body panel.

It is also preferred that the lower end of the outer cylinder 2 is curved radially outwardly over the entire circumference as shown in FIG. 5, and/or a bulging portion 2a bulging radially outwardly is formed in the outer circumferential surface of the upper end of the outer cylinder 2 over the entire circumference as shown in FIG. 6.

Figure 7:
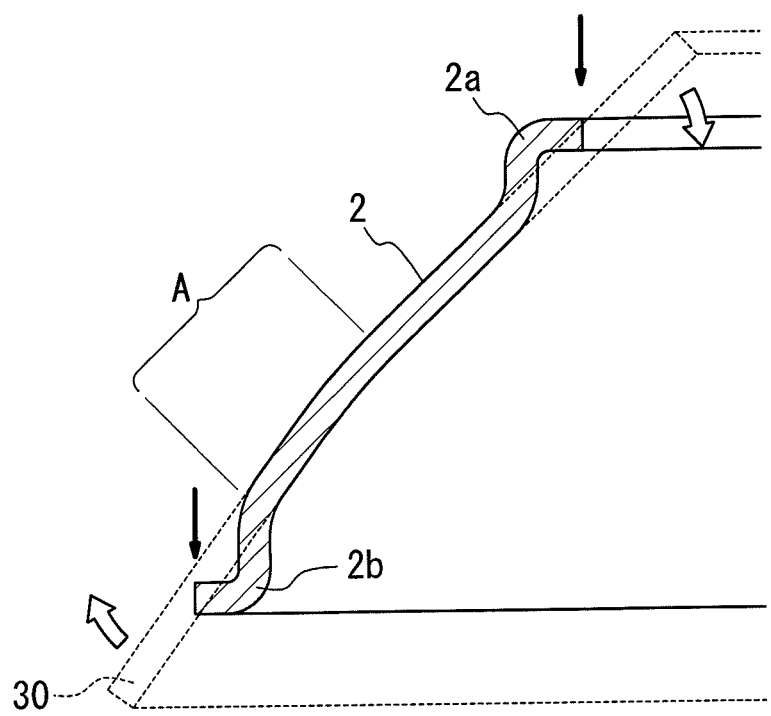
FIG. 7 is an enlarged sectional view, illustrating the outer cylinder of a strut mount of another embodiment, which is removed from the strut mount.
Figure 8:
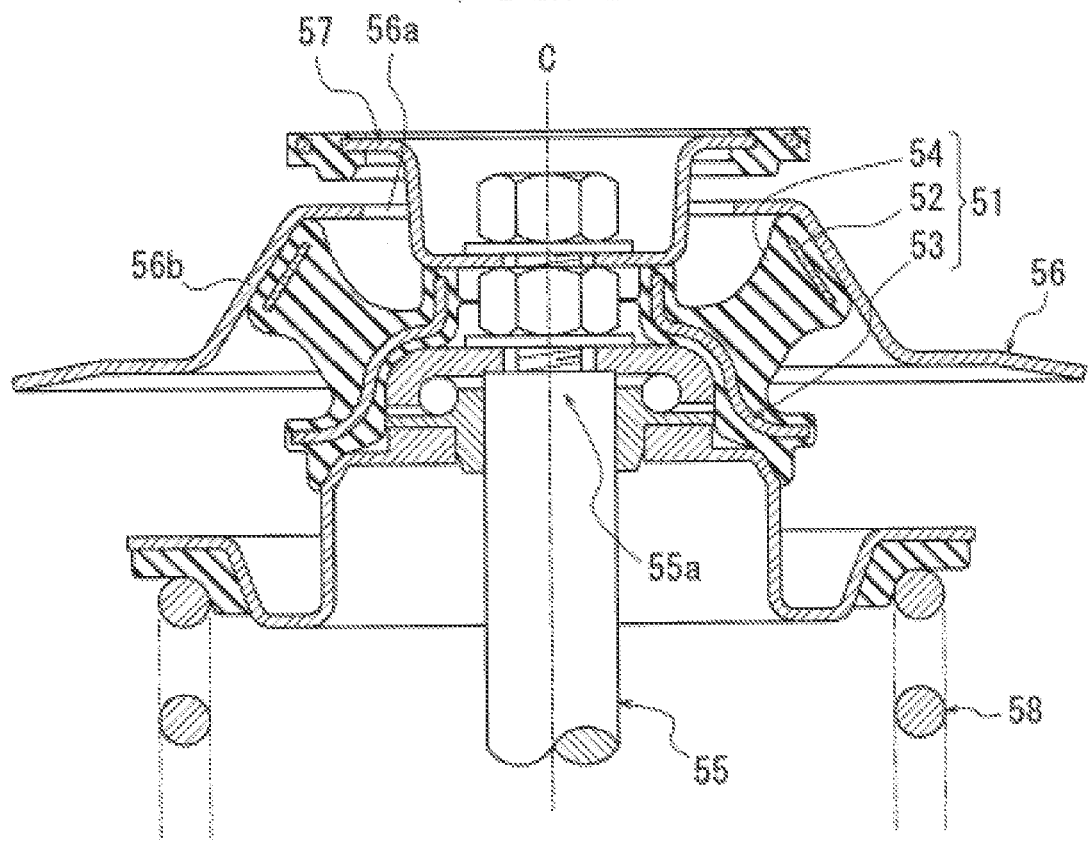
FIG. 8 is a vertical sectional view including a central axis, illustrating a suspension device with a conventional strut mount attached thereto.
Figure 9:
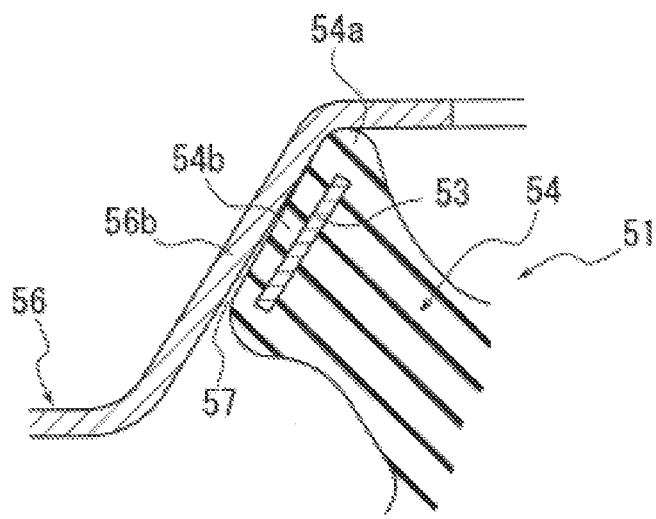
FIG. 9 is an enlarged vertical sectional view of essential parts, illustrating a part where the strut mount shown in FIG. 8 is fitted to a vehicle body panel.

In this case, a curved portion and a bulging portion as mentioned above may be formed in the outer cylinder 2 in the following way: as shown in FIG. 7 illustrating the outer cylinder removed from the strut mount, for example, the upper end and lower end parts of an annular body 30, which is formed in advance in the shape of a circular truncated cone as indicated by broken line, are respectively subjected to bending process in radially inward and outward directions as indicated by white arrows, and subsequently the bent parts are both press cut in a direction orthogonal to the side surface of the bent part, as indicated by black arrows.

Consequently, a bulging portion 2a and a curved portion 2b may be formed in the upper and lower ends of the outer cylinder 2, respectively, under high quality cutting of respective edge surfaces of the upper and lower ends. Consequently, when using the strut mount 1, it is possible to prevent occurrence of cracks more effectively in the elastic member 4 at the upper and lower ends of the outer cylinder 2 covered with the elastic member 4, which would otherwise be caused by contact between the elastic member 4 which undergoes escaping deformations by which it is forced to move around to the outer circumference side of the outer cylinder 2 and the ends, particularly, said edge surfaces of the outer cylinder 2. Optionally, a lower half region A of the outer circumferential surface of the outer cylinder 2, shown in FIG. 7, may be formed as a region which comes in contact with the vehicle body panel 10 via the elastic member 4 covering the surface thereof.

Although not shown in the drawings, the strut mount 1 may be provided with one or more rubber protrusions which protrude radially outwardly in a surface of a portion of the elastic member 4 thereof which comes in contact with the tapered sidewall 12 of the vehicle body panel 10, i.e., the portion 4a which covers the outer circumferential surface of the outer cylinder 2

In using the strut mount 1 shown in FIG. 1, the ring-shaped thrust bearing 23, which has a cylindrical portion 23a protruding downwardly on its bottom surface, is fitted to the inside of the shoulder portion 3a of the inner cylinder 3. The bracket 24 is attached to the bottom surface of the thrust bearing 23 so as to surround the cylindrical portion 23a under pressure of the coil spring 22, while the strut rod 21 is inserted and placed into the cylindrical portion 23a of the thrust bearing 23.

In this case, the bracket 24 comprises: a circular cylindrical portion 24a with a bottom wall which has a hole formed on its top surface so as to surround the cylindrical portion 23a of the thrust bearing 23 and forms an inverted U-shape when viewed in the cross-section shown; a flange portion 24b which is formed on the rim on the bottom end of the circular cylindrical portion 24a and forms a substantially L-shape when viewed in the cross-section shown; and a flat-plate annular portion 24c which is formed continuously with the rim on the outer circumference side of the flange portion 24b so that it is raised from that flange portion 24b. Additionally, as illustrated in the figure, a ring-shaped spring supporting plate 25 of elastic material is disposed over the outer circumferential surface of a side wall raised from the L-shaped flange 24b as well as the bottom surface of the flat-plate annular portion 24c of the bracket 24. Then, the coil spring 22 is seated on this spring supporting plate 25. In this way, the pressing force of the coil spring 22 is supported by the bracket 24.

In addition, in this case, a male screw portion 21b, which is formed on the upper end 21a of the strut rod 21, penetrates through the inside of the thrust bearing 23 and then is connected to the thrust bearing 23 by being tightened with a lower female screw member 26.

With this configuration, the strut mount 1 is assembled while being pressed against the inside of the vehicle body panel 10, without any special connecting and fixing means.

Further, in the suspension device shown, arranged in the through-hole 11 formed in the bottom surface of the vehicle body panel 10 is a dish-shaped stopper fitting 27, which is provided with a peripheral wall having an outer diameter that is somewhat smaller than the diameter of the through-hole 11. Then, the upper end of the male screw portion 21b of the strut rod 21 that protrudes upward from the lower female screw member 26 is inserted into a hole which is formed in the bottom wall of the stopper fitting 27. Then, the upper female screw portion 28 is screwed into the male screw portion 21b so that the stopper fitting 27 is fastened and secured to the strut rod 21 between the upper and lower female screw members.

This dish-shaped stopper fitting 27 prevents withdrawal of the strut rod 21 from the strut mount 1 by using a flange 27a, which is formed continuously with the upper end of the stopper fitting 27 and abuts the flat annular portion 13 of the vehicle body panel 10 when any force acts on the strut rod 21 downwardly along the central axis C. In this case, the flange 27a at which the stopper fitting 27 abuts the vehicle body panel 10 is covered with a protection rubber 29 to prevent damage to these members.

REFERENCE NUMERALS

1 Strut mount
2 Outer cylinder
2a Bulging portion
2b Curved portion
3 Inner cylinder
3a Shoulder portion
4 Elastic member
4a Portion coating outer circumferential surface of outer cylinder
4b Portion coating upper end of outer cylinder
10 Vehicle body panel
11 Through-hole
12 Tapered sidewall
13 Flat annular portion
21 Strut rod
21a Upper end
21b Male screw portion
22 Coil spring
23 Thrust bearing
23a Cylindrical portion
24 Bracket
24a Circular cylindrical portion
24b Flange portion
24c Flat-plate annular portion
25 Spring backing plate
26 Lower female screw portion
27 Stopper fitting
27a Flange
28 Upper female screw portion
29 Protection rubber
30 Annular body

The invention claimed is:

1. A strut mount comprising:
an outer cylinder formed in a tapered shape having a diameter increasing downward along its central axis;
an inner cylinder arranged on an inner circumference side of the outer cylinder; and
an elastic member connecting the outer cylinder and the inner cylinder and covering an outer circumferential surface and ends of the outer cylinder,
the strut mount being subjected to use with a strut rod extending from a wheel and a vehicle body panel shaped like an inverted dish and provided with a through-hole in its bottom surface by positioning the strut mount so that an upper end of the strut rod penetrates through the inside of the inner cylinder, and the outer cylinder is fitted to an inner surface of the vehicle body panel, wherein:

an acute inclination of the outer circumferential surface of the outer cylinder with respect to the central axis of the outer cylinder is greater than that of an inner circumferential surface of a tapered sidewall of the vehicle body panel shaped like an inverted dish, and the elastic member is shaped such that when the strut mount is positioned to be fitted to the vehicle body panel, the elastic member is brought into contact with the inner surface of the vehicle body panel only at a portion of the elastic member that covers the outer circumferential surface of the outer cylinder, and a portion of the elastic member covering an upper end of the ends of the outer cylinder is kept from contact with the bottom surface of the vehicle body panel.

2. The strut mount according to claim 1, wherein the portion of the elastic member that covers the outer circumferential surface of the outer cylinder has a larger thickness in an upper part than in a lower part of the central axis of the outer cylinder.

3. The strut mount according to claim 1, wherein an inner circumferential surface of a lower end of the outer cylinder is provided with a curved surface facing radially inwardly over the entire circumference of the inner circumferential surface.

4. The strut mount according to claim 1, wherein a lower end of the outer cylinder extends toward the outer radial side outwardly over the entire circumference of the lower end.

5. The strut mount according to claim 1, wherein a bulging portion bulging radially outwardly is formed in the outer circumferential surface of an upper end of the outer cylinder over the entire circumference of the outer circumferential surface.

* * * * *